(12) United States Patent
Brewer et al.

(10) Patent No.: US 8,740,463 B2
(45) Date of Patent: Jun. 3, 2014

(54) INTEGRAL SPHERICAL BEARING AND LUG FOR AEROSPACE APPLICATIONS

(71) Applicants: Paul R. Brewer, Bristol (GB); Steven Shortcott, Gloucestershire (GB); Philip Andrew Rowles, Bristol (GB); Reg R. Raval, North Somerset (GB)

(72) Inventors: Paul R. Brewer, Bristol (GB); Steven Shortcott, Gloucestershire (GB); Philip Andrew Rowles, Bristol (GB); Reg R. Raval, North Somerset (GB)

(73) Assignee: Claverham Ltd. (GB)

( * ) Notice: Subject to any disclaimer, the term of this patent is extended or adjusted under 35 U.S.C. 154(b) by 0 days.

(21) Appl. No.: 13/667,181

(22) Filed: Nov. 2, 2012

(65) Prior Publication Data

US 2014/0010486 A1    Jan. 9, 2014

(30) Foreign Application Priority Data

Jul. 6, 2012  (EP) .................................... 12250133

(51) Int. Cl.
*F16C 23/04*    (2006.01)
(52) U.S. Cl.
USPC .......................................... 384/206; 384/212
(58) Field of Classification Search
USPC ..................... 384/192, 206–212; 29/898.043, 29/898.051
See application file for complete search history.

(56) References Cited

U.S. PATENT DOCUMENTS

| 2,345,564 | A  | * | 4/1944  | Allen ............................ 384/208 |
| 3,107,954 | A  | * | 10/1963 | Rudy ............................ 384/212 |
| 4,248,486 | A  |   | 2/1981  | Bradley, Jr. |
| 5,524,987 | A  | * | 6/1996  | Vigeh ............................ 384/209 |
| 6,209,206 | B1 | * | 4/2001  | Harris et al. .............. 29/898.043 |
| 7,559,698 | B2 | * | 7/2009  | Shore ............................ 384/192 |
| 2007/0014497 | A1 | * | 1/2007  | Wood et al. ................... 384/192 |
| 2007/0223850 | A1 | * | 9/2007  | Lopes et al. .................. 384/192 |
| 2010/0269629 | A1 |   | 10/2010 | Nunn et al. |

FOREIGN PATENT DOCUMENTS

| GB | 816873  | 7/1959 |
| WO | 9413967 | 6/1994 |

OTHER PUBLICATIONS

Notification of Transmittal of the European Search Report and the European Search Opinion of the European Searching Authority, Reference 30.28.112668/Application No. 12250133.1-2424; Nov. 12, 2012.

* cited by examiner

*Primary Examiner* — Phillip A Johnson
(74) *Attorney, Agent, or Firm* — Cantor Colburn LLP

(57) ABSTRACT

A bearing assembly and a method of forming a bearing assembly is provided including a housing having a bore. The bore has a generally concave inner surface. The bearing assembly also includes a bearing having an inner member. The inner member is movable about a central axis and is dimensioned to fit within the bore. The inner member has a generally convex outer surface complementary to the concave inner surface of the bore. The housing functions as an outer member of the bearing.

6 Claims, 5 Drawing Sheets

INTEGRAL SPHERICAL BEARING AND LUG FOR AEROSPACE APPLICATIONS

CROSS REFERENCE TO RELATED APPLICATIONS

This application claims priority to European Patent Application No. 12250133.1, filed Jul. 6, 2012, the entire contents of which is incorporated herein by reference.

BACKGROUND OF THE INVENTION

Exemplary embodiments of this invention generally relate to bearings and, more particularly, to mounting a spherical bearing in a bearing assembly for use in aerospace applications.

Conventional spherical bearings include a ball-like inner member having a convex outer surface. These bearings also include an outer member having a concave inner surface complementary to the convex outer surface of the inner member. Spherical bearings are commonly used in the aircraft industry, as well as in linkages and actuators because they are "self-aligning." In many of these applications, the spherical bearing is commonly swaged, bonded, peened, staked, or press-fit into a housing, such as a rod end for example, making the bearing difficult to remove and maintain. To facilitate this installation process, a suitable profile is machined into either the surface of the outer member or the housing. Such an installation process is both costly and time consuming.

In addition, conventional spherical bearing configurations are inadequate when used in high frequency load reversing applications. High frequency cyclical loading causes fretting between the outer member and the mounting or housing, and ultimately leads to metal fatigue. Similarly, crevice corrosion may occur in the clearance between the outer member and the mounting. Also, the positional accuracy of the bearing decreases due to the concentric misalignment of the outer member within the hole in the housing.

BRIEF DESCRIPTION OF THE INVENTION

According to one embodiment of the invention, a bearing assembly for use in an aircraft is provided including a housing having a bore. The bore has a generally concave inner surface. The bearing assembly also includes a bearing split into a first portion and a second portion along a plane. The bearing is movable about a central axis and is dimensioned to fit within the bore. The bearing has a generally convex outer surface complementary to the concave inner surface of the bore. The housing functions as an outer member of the bearing.

According to another embodiment of the invention, a bearing assembly for use in an aircraft is provided including a housing having a bore and a loading slot adjacent a portion of the bore. The bore has a generally concave inner surface. The bearing has an inner member movable about a central axis. The bearing is dimensioned to fit within the bore. The inner member of the bearing has a generally convex outer surface complementary to the concave inner surface of the bore. The housing functions as an outer member of the bearing.

According to an alternate embodiment of the invention, a method of mounting a bearing within a housing is provided including forming a first portion and a second portion of the bearing. The first portion of the bearing is then moved relative to the second portion into a rotated configuration. The first portion and the second portion are inserted into the bore of the housing in the rotated configuration. The first and second portion of the bearing are then separated and rotated to form a whole bearing.

According to yet another embodiment of the invention, a method of mounting a bearing within a housing is provided including forming a loading slot in the housing adjacent the bore. The bearing is then inserted into the bore and the loading slot such that a central axis of the bearing is perpendicular to a central axis of the bore. The bearing is then rotated into an operating position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
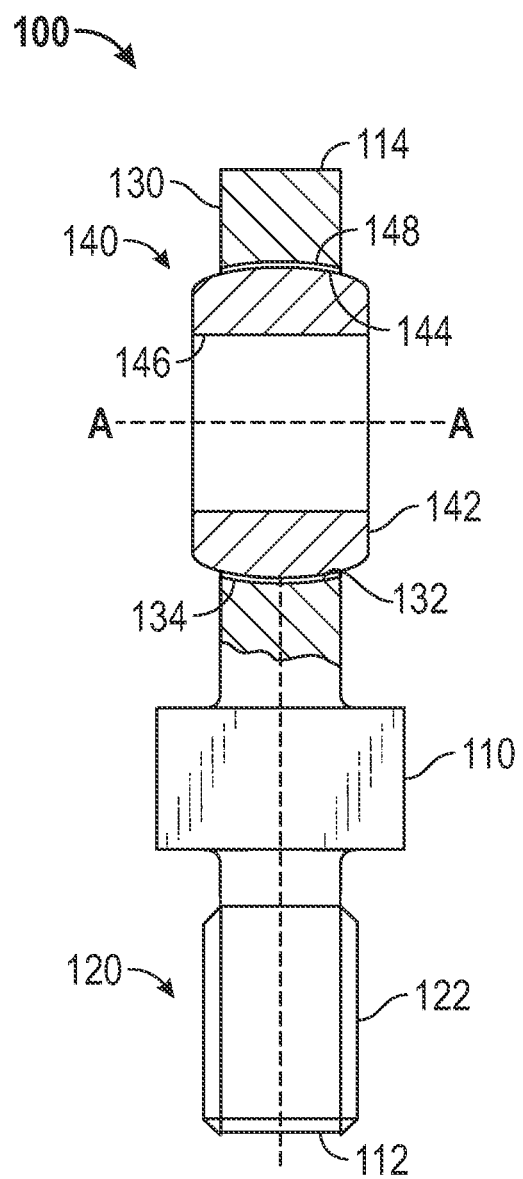
FIG. 1 is a partial cross-section of an exemplary bearing assembly according to an embodiment of the invention.

Referring now to FIG. 1, an exemplary bearing assembly 100 is illustrated including a housing 110 and a bearing 140. Exemplary housings 110 include a rod end, a heim joint, a lug, or any other means designed to receive a bearing. The housing 110 includes a threaded coupling portion 120 immediately adjacent a first end 112, and a mounting portion 130 disposed at a second, opposite end 114. In one embodiment, the mounting portion 130 and the coupling portion 120 are formed integrally.

In one embodiment, the coupling portion 120 of the housing may include a threaded shaft 122 (see FIG. 5) that connects the housing 110 to another component. The threads 124 on the shaft 122 may be left-handed or right-handed and may be male or female. In another embodiment, the shaft 122 of the coupling portion 120 may include a through hole (not shown), such that when the through hole is aligned with a hole of a complementary component, a pin (not shown) may be inserted to limit movement of the housing 110 relative to the component. The shaft 122 may include any other means known to a person skilled in the art for connecting the housing 110 to another component.

At the general center of the mounting portion 130 is a bore 132 within which the bearing 140 is mounted. In one embodiment, the mounting portion 130 is an eye-shaped head. The bore 132 has a central axis A which is also the loading axis of the housing 110. The inside surface 134 of the bore 132 has a generally concave profile. The bearing 140 includes a generally ball-shaped inner member 142 having a central axis B (see FIG. 2) and convex outer surface 144. The inner surface 146 of the inner member 142 includes a generally linear bore for engagement with a component, such as a shaft for example. The convex outer surface 144 of the inner member 142 is complementary to and dimensioned to match the concave inner surface 134 of the bore 132. The concave inner surface 134 of the bore 132 engages the outer surface 144 of the bearing 140 such that the inner member 142 can rotate and pivot relative to the housing 110. An anti-friction liner 148 may be positioned between the concave inner surface 134 of the bore 132 and the convex outer surface 144 of the inner member 142 to facilitate movement of the inner member 142. In one embodiment, the anti-friction layer 148 is a coating on either the concave inner surface 134 or the convex outer surface 144. Exemplary anti-friction liners 148 include Teflon fabrics and composites, or other materials known to a person skilled in the art.

Figure 2:
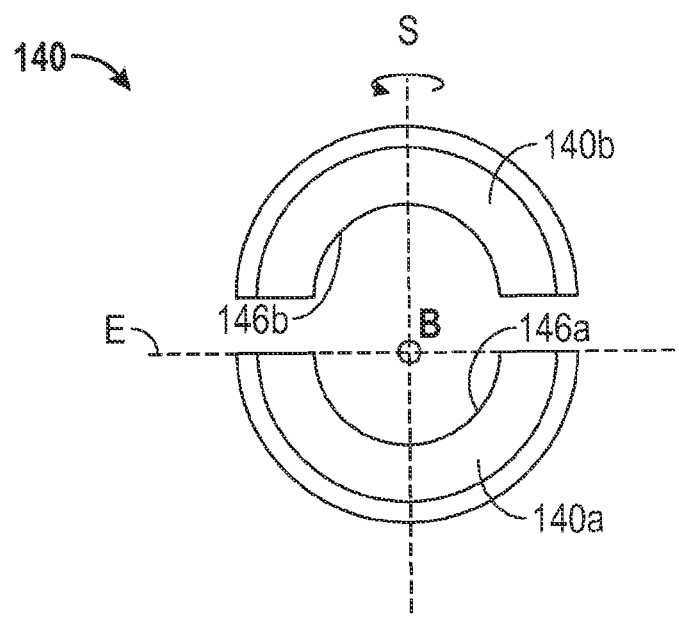
FIG. 2 is a front view of a bearing according to an embodiment of the invention.
Figure 3:
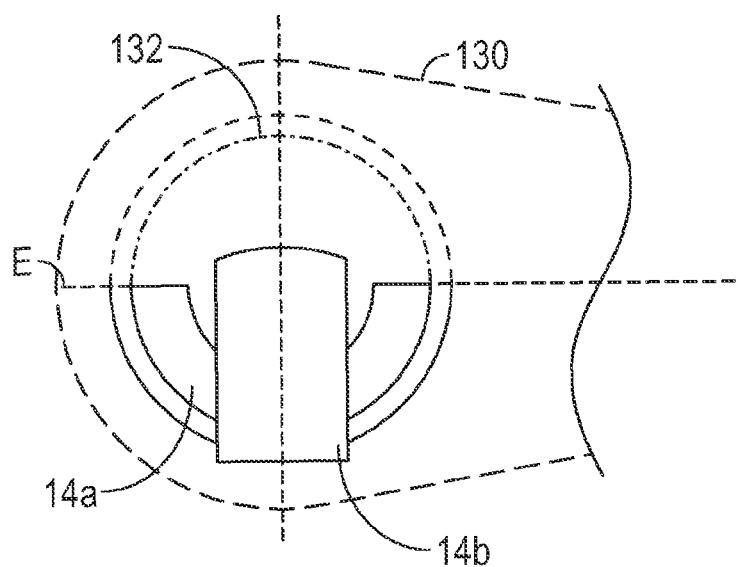
FIG. 3 is a side view of a bearing being assembled into a housing according to an embodiment of the invention.
Figure 4:
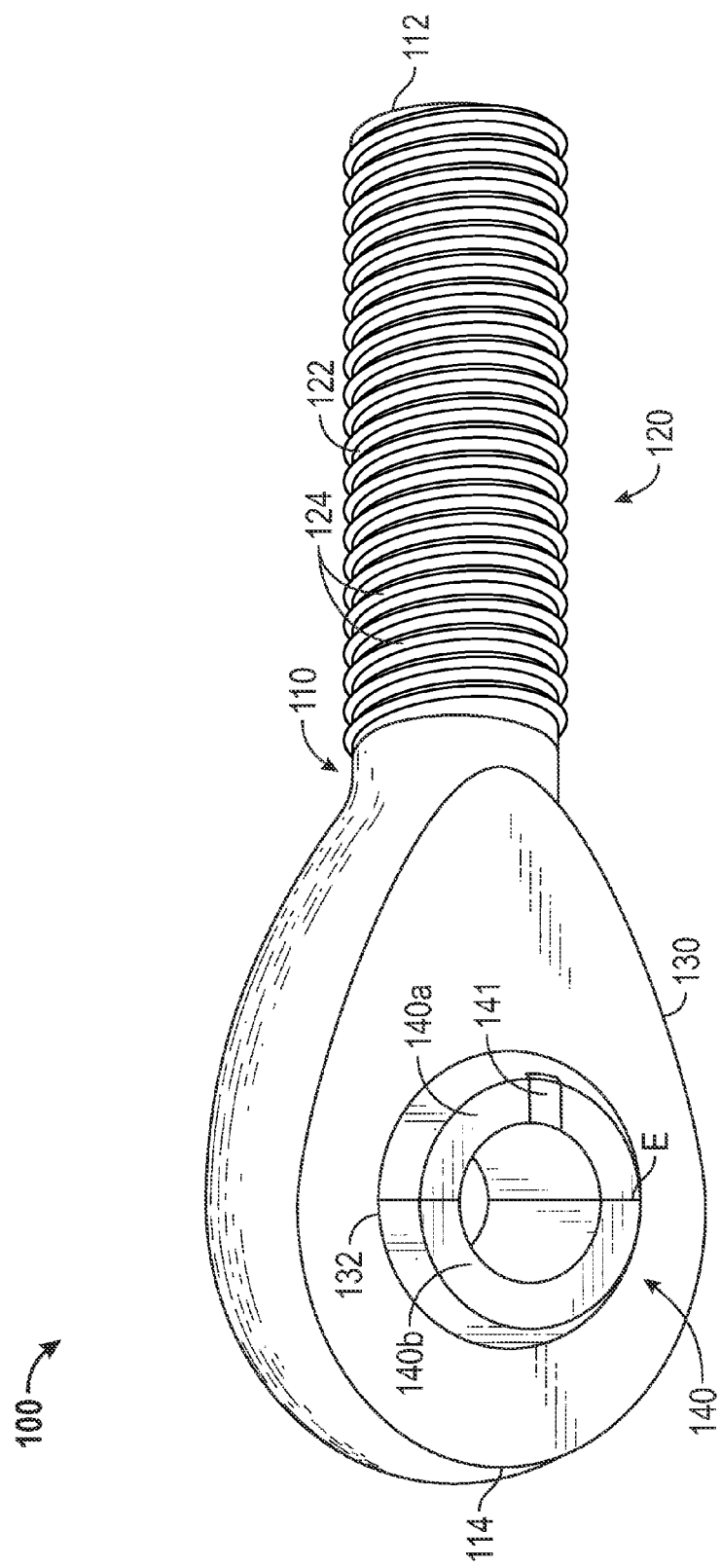
FIG. 4 is a isometric view of an exemplary bearing assembly according to an embodiment of the invention.

In one embodiment, the bearing 140 may be mounted within the bore 132 of the housing 110 using conventional processes, such as swaging for example. However, because the inner surface 134 of the bore 132 directly engages the outer surface 144 of the bearing, an alternate, more simplified processes may be used to mount the bearing 140 in the housing 110. Referring now to FIGS. 2 through 4, a first installation method is illustrated. The bearing 140 is divided into two portions 140a, 140b. The bearing may be divided equally or into another arrangement such as an offset or staggered configuration. The bearing 140 may be manufactured as a whole and then divided along a plane of separation E, or alternately, may be manufactured as two separate portions 140a,, 140b, that fit together to form the whole bearing 140. As illustrated in FIG. 2, the first and second portion 140a,, 140b, are positioned facing one another to form a whole bearing 140. The second portion 140b, is then rotated 90 degrees within plane E, in the direction indicated by arrow S, such that the inner surface 146b, of the second portion 140b, of the bearing 140 is in contact with the inner surface 146a, of the first portion 140a. While in this configuration, illustrated in FIG. 3, the first portion 140a, and the second portion 140b, of the bearing 140 are inserted into the bore 132 of the housing 110. Once located within the bore 132, the two portions 140a,, 140b, can be separated and rotated to form the complete bearing 140.

Referring now to the exemplary bearing assembly illustrated in FIG. 4, when assembly is complete, the plane E between the first portion 140a, and the second portion 140b, of the bearing 140 is perpendicular to the length of the housing 110. Bearing assemblies 100 constructed in this manner may be used in applications having normal angular misalignment. By splitting the bearing 140 into portions 140a, 140b,, the continuity of the inner surface 134 of the bore 132 is maintained. In one embodiment, one or both portions 140a,, 140b, of the bearing 140 may include a locking feature 141 that aligns the halves 140a,, 140b, with a mating shaft (not shown) without reducing the strength of the shaft or the bearing 140. The locking feature 141 may include a slot in each portion 140a,, 140b, of the bearing 140 configured to engage a protrusion on the shaft. The locking feature 141 also prevents rotation of the bearing 140 to a position where the plane of separation between the portions 140a, 140b, is aligned with the loading direction of the bearing 140.

Figure 5:
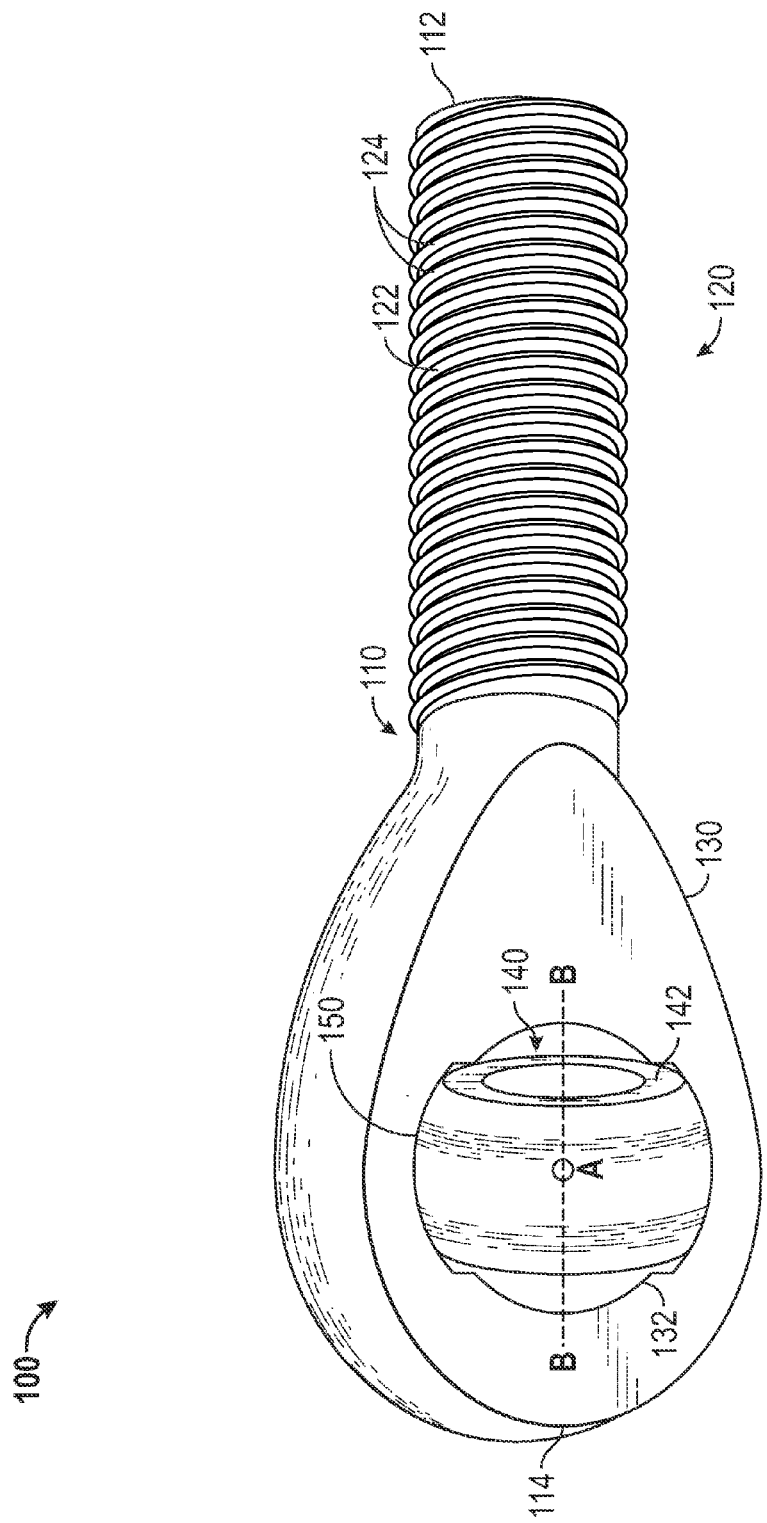
FIG. 5 is a isometric view of a housing as a bearing is assembled within the housing according to an embodiment of the invention.
Figure 6:
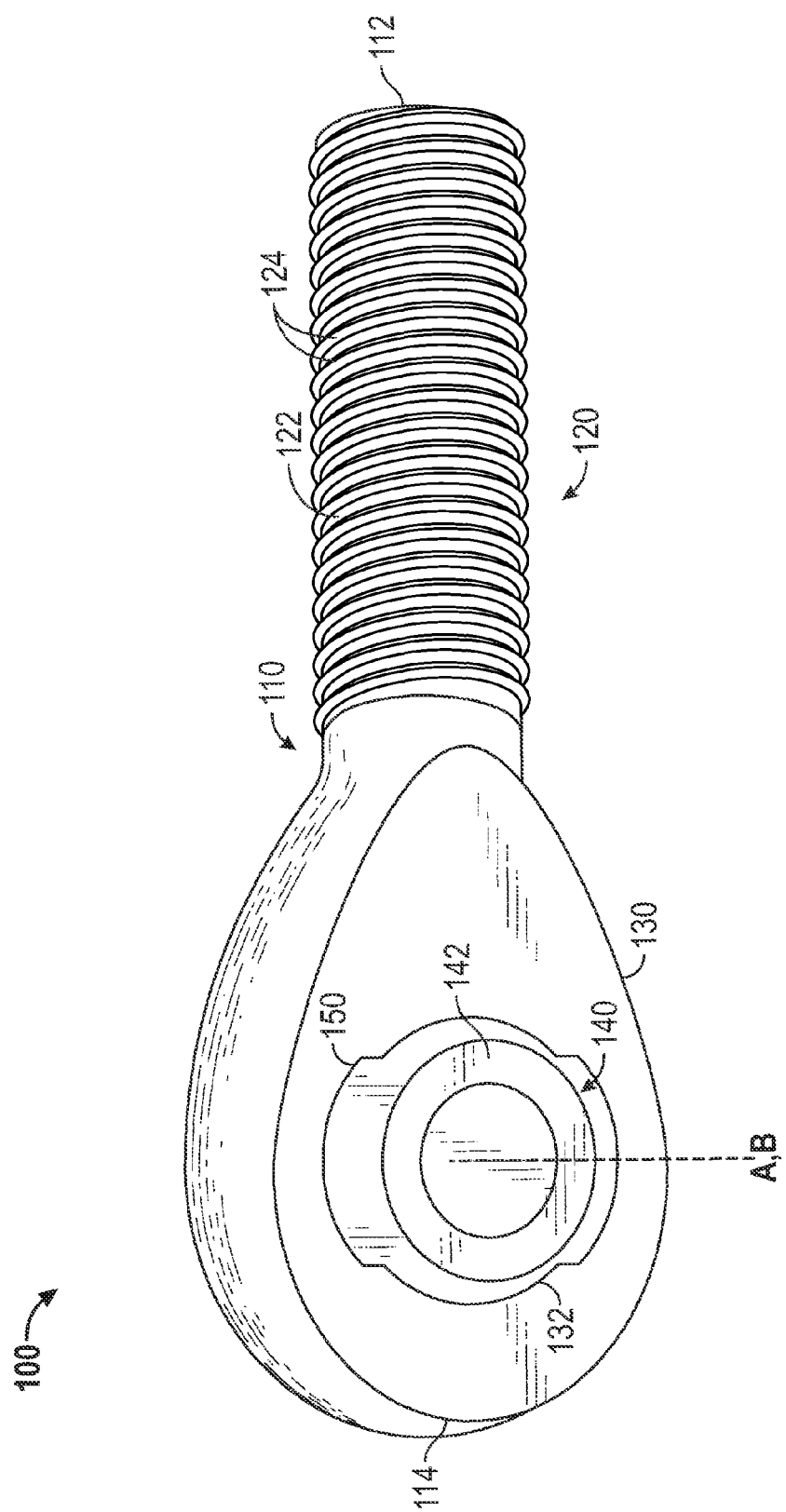
FIG. 6 is a isometric view of an exemplary bearing assembly according to an embodiment of the invention.

Referring now to FIGS. 5 and 6, an alternate installation method may be used to construct the illustrated bearing assembly 100. The mounting portion 130 of the housing 110 includes an additional loading slot 150 adjacent a portion of the bore 132, and perpendicular to the length of the housing 110. In one embodiment, the loading slot 150 is generally the same size as the projection of the bearing 140. The whole bearing 140 is inserted into the bore 132 and loading slot 150 such that the central axis B of the bearing 140 is perpendicular to the central axis A of the bore 132. Once inserted, the bearing 140 is then rotated 90 degrees to an operating position (see FIG. 6) such that the central axis B of the bearing 140 and the central axis A of the bore 132 are aligned. In one embodiment, a filler material, such as silicone for example, is inserted into the loading slot 150 to prevent debris and other contaminants from affecting the operation of the bearing 140. A bearing assembly 100 formed using this installation method can be used in applications having normal or high angular misalignment, because the integrity of the bearing is maintained during the installation process. In another embodiment, sealing membranes made of a soft, flexible material may be positioned on either side of the bearing 140 during installation. In such instances, these membranes would allow normal misalignment of the bearing assembly 100 while preventing contamination by debris.

By using the housing as the outer member of the bearing, the potential for fretting and corrosion is reduced such that the additional coatings previously used to protect against fretting and corrosion are no longer required. Elimination of the separate outer member also reduces the weight and complexity of the bearing and the size of the housing. The positional accuracy of the bearing is improved and the risk of bearing migration is removed. In addition, the process of mounting the bearing within the housing is simplified and more cost effective.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention, which is defined by the claims. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of mounting a bearing in a housing comprising:
    forming a first portion and a second portion of the bearing;
    moving the first portion relative to the second portion into a rotated configuration;
    inserting each of the first portion and the second portion into the bore of the housing in the rotated configuration; and
    separating and rotating the first portion and the second portion of the bearing within the bore to form a whole bearing.

2. The method according to claim 1, further comprising dividing a unitary bearing into the first portion and the second portion.

3. The method according to claim 2, wherein one of the first portion and second portion includes a locking feature.

4. The method according to claim 1, further comprising separately manufacturing each of the first portion and the second portion.

5. The method according to claim 1, wherein in the rotated configuration, the first portion and the second portion are perpendicular to each other, such that an inner surface of the first portion is adjacent an inner surface of the second portion.

6. The method according to claim 1, further comprising aligning the first portion and second portion as a whole and rotating each of the portions within the bore to a position such that a plane formed at an interface between the first portion and the second portion is perpendicular to a length of the housing.

* * * * *